United States Patent
Engelhard

(10) Patent No.: US 9,623,630 B2
(45) Date of Patent: Apr. 18, 2017

(54) RELEASE FILM HAVING A ROUGH SURFACE STRUCTURE

(75) Inventor: Heinz Engelhard, Nürnberg (DE)

(73) Assignee: INFIANA GERMANY GMBH & CO., KG, Luxembourg (LU)

( * ) Notice: Subject to any disclaimer, the term of this patent is extended or adjusted under 35 U.S.C. 154(b) by 797 days.

(21) Appl. No.: 13/985,155

(22) PCT Filed: Feb. 6, 2012

(86) PCT No.: PCT/EP2012/000522
§ 371 (c)(1),
(2), (4) Date: Aug. 13, 2013

(87) PCT Pub. No.: WO2012/110206
PCT Pub. Date: Aug. 23, 2012

(65) Prior Publication Data
US 2013/0316113 A1    Nov. 28, 2013

(30) Foreign Application Priority Data

Feb. 15, 2011   (DE) .................. 10 2011 011 296
Nov. 8, 2011    (DE) .................. 10 2011 117 831

(51) Int. Cl.
| | |
|---|---|
| B32B 7/06 | (2006.01) |
| B32B 27/20 | (2006.01) |
| G09F 3/10 | (2006.01) |
| B32B 27/08 | (2006.01) |
| B32B 27/28 | (2006.01) |

(52) U.S. Cl.
CPC ............. *B32B 7/06* (2013.01); *B32B 27/08* (2013.01); *B32B 27/20* (2013.01); *B32B 27/283* (2013.01); *G09F 3/10* (2013.01); *B32B 2307/538* (2013.01); *Y10T 428/141* (2015.01); *Y10T 428/1476* (2015.01); *Y10T 428/24372* (2015.01); *Y10T 428/24405* (2015.01)

(58) Field of Classification Search
None
See application file for complete search history.

(56) References Cited

U.S. PATENT DOCUMENTS

| | | | |
|---|---|---|---|
| 5,082,704 A | 1/1992 | Higgins | |
| 5,232,756 A | 8/1993 | Chang et al. | |
| 5,587,024 A | 12/1996 | Nakayama et al. | |
| 7,776,417 B2 * | 8/2010 | Mohseen | B32B 11/00 428/353 |
| 2005/0003216 A1 | 1/2005 | Frances et al. | |
| 2007/0224378 A1 | 9/2007 | Takeuchi et al. | |
| 2011/0297887 A1 | 12/2011 | Wheeler | |
| 2012/0034407 A1 * | 2/2012 | Yamanaka | C09J 5/06 428/40.2 |
| 2012/0258272 A1 | 10/2012 | Engelhard et al. | |
| 2013/0004714 A1 * | 1/2013 | Mauser | B32B 27/08 428/152 |
| 2013/0149497 A1 * | 6/2013 | Enniss | B32B 19/02 428/150 |

FOREIGN PATENT DOCUMENTS

| | | |
|---|---|---|
| DE | 38 39 120 A1 | 5/1990 |
| DE | 692 26 383 T2 | 12/1999 |
| DE | 199 62 114 A1 | 7/2000 |
| DE | 10 2009 054 322 A1 | 5/2011 |
| EP | 0 769 540 A2 | 4/1997 |
| EP | 1 277 802 A1 | 1/2003 |
| JP | 02-024374 A | 1/1990 |
| JP | H075-06381 A | 7/1995 |
| JP | 11-240110 A | 9/1999 |
| JP | 2008-531242 A | 8/2008 |
| JP | 2013-511415 T | 4/2013 |
| WO | 2011/063914 A1 | 6/2011 |

OTHER PUBLICATIONS

"Brakem INSPIRE 137 NA Performance Polypropylene Polymer", Plastic Material Data Sheets, Matweb, 2013.*
"Table 2. Melting Points of Common Refractories", ASM Handbook, vol. 13C-Corrosion: Environments and Industries, ASM Internationa, 2006.*
German Search Report, dated Sep. 14, 2011.
International Search Report mailed Aug. 31, 2012.
English Translation of International Search Report mailed Aug. 31, 2012.

* cited by examiner

*Primary Examiner* — Nicole M Buie-Hatcher
(74) *Attorney, Agent, or Firm* — Norris McLaughlin & Marcus PA

(57) ABSTRACT

Release film having at least one layer based on at least one thermoplastic polymer as matrix polymer, in which solid microparticles having a melting point which is at least 10° C. higher than that of the matrix polymer are dispersed therein and surfaces of which at least one is provided with a release layer as outer layer based on at least one cured polysiloxane.

15 Claims, No Drawings

RELEASE FILM HAVING A ROUGH SURFACE STRUCTURE

This is a 371 of PCT/EP2012/000522 filed 6 Feb. 2012 (international filing date), claiming priority of German application 10 2011 011 296.0 filed 15 Feb. 2011 and German application 10 2011 117 831.0 filed 8 Nov. 2011.

The present invention relates to a release film comprising at least one layer (s) based on at least one thermoplastic matrix polymer comprising dispersed solid microparticles having a melting point at least 10° C. higher than that of the matrix polymer, at least one of the surfaces of the release film is covered by a release layer (b) as outer layer, based on at least one cured polysiloxane; to a use of such a release film as releasable protective and cover film; and to a roofing sheet provided with a release film of this kind as releasable protective and cover film.

BACKGROUND OF THE INVENTION

Release films are widely used as releasable protective films for adhesive tapes or self-adhesive labels, in order to prevent these single- or double-sidedly adhesive products from sticking during storage. Such films are required, furthermore, to have a sufficient release effect against adhesives.

From the prior art, such as from EP 1 277 802 A1 or EP 0 769 540 A2, for example, release films are already known, which for the purpose of obtaining a good release effect are siliconized on at least one side.

For certain technical applications, such as for materials with a high adhesive effect even at ambient temperature, for example, the releasability of the known release films is often not sufficient, to prevent difficulties during the handling of such adhesive articles, especially in order to remove the release film.

In order to improve the removal of conventional release films from such highly adhesive materials, the prior art recommends providing the release films with an embossed structure. A disadvantage for the releasability of such films having an embossed structure is that the embossed structure of the release film may suffer damage on exposure to pressure like in a winded-up condition or exposure to tensile load and/or exposure to thermal stress like during further processing steps, and the releasability of the release film, at least at the parts of damage, is inadequate.

Therefore, there is a need for release films which have a very good releasability from strongly adhesive materials, although the release film neither is provided with an embossed structure nor has a foam structure.

It was an object of the present invention, therefore, to provide release films which even without any embossed structure and/or without any foam structure, are distinguished by an excellent release efficiency from adhesives and/or adhesive materials which exhibit a high adhesive strength preferably already at an ambient temperature.

BACKGROUND OF THE INVENTION

This object is achieved by providing of a release film without any foam structure and having a nonplanar, however unembossed surface structure, comprising at least one layer (s) based on at least one thermoplastic matrix polymer, wherein solid microparticles having a melting point at least 10° C. higher than that of the matrix polymer are distributed, and at least one of the surfaces of the release film is covered by a release layer (b) as outer layer, based on at least one cured polysiloxane.

DETAILED DESCRIPTION

The layer (s) of the inventive release film is preferably based on at least one thermoplastic polymer selected from the group comprising olefin homopolymers or copolymers, preferably ethylene and/or propylene homopolymers or copolymers, and polyamides or copolyamides.

The matrix polymer of layer (s) of the inventive release film is preferably based on at least one thermoplastic olefin homopolymer or copolymer, more preferably on at least one thermoplastic olefin homopolymer or copolymer of α,β-unsaturated olefins having preferably 2-8 carbon atoms. Very preferably the layer (s) can be based on at least one ethylene homopolymer or copolymer (PE, more particularly LDPE or HDPE), propylene homopolymer or copolymer (PP), butylene homopolymer or copolymer (PB), isobutylene homopolymer or copolymer (PI), or on mixtures of at least two of these polymers, more particularly on a propylene homopolymer or copolymer.

"LDPE" denotes low-density polyethylene, having a density in the range of 0.86-0.93 g/cm$^3$ and featuring a high degree of branching of the molecules. "HDPE" denotes high-density polyethylene, which features only a low level of branching of the molecule chain, with the density being situated in the range between 0.94 and 0.97 g/cm$^3$.

Additionally suitable as matrix polymers for preparing the layer (s) are preferably at least one homopolyamide or copolyamide selected from the group comprising thermoplastic aliphatic, partly aromatic, or aromatic homopolyamides or copolyamides. These homopolymamides or copolymamides may be prepared from diamines such as aliphatic diamines having 2-10 carbon atoms, more particularly hexamethylenediamine, and/or aromatic diamines having 6-10 carbon atoms, more particularly p-phenylenediamine, and from dicarboxylic acids such as aliphatic or aromatic dicarboxylic acids having 6-14 carbon atoms, preferably adipic acid, terephthalic acid, or isophthalic acid. Homopolyamides or copolyamides may further be prepared from lactams having 4-10 carbon atoms, such as ε-caprolactam, for example. Polyamides used in accordance with the invention are preferably PA 6, PA 12, PA 66, PA 6I, PA 6T or corresponding copolymers, or mixtures of at least two of these polyamides.

The nonplanar surface structure of the inventive release film is based preferably on solid microparticles which are distributed in the layer(s) and which are based preferably on at least one thermoplastic polymer, more preferably on an olefin homopolymer or copolymer, the melting point of which is at least 10° C. higher, preferably at least 30° C. higher, than the melting point of the matrix polymer of the layer (s). This is also a requirement for the use of microparticles which consist essentially of inorganic compounds or of inorganic materials.

The microparticles preferably have a particle size of at least 50 μm, more preferably a particle size distribution of 50 μm to 500 μm, very preferably of 50 μm to 300 μm, determined by means of microscopic recordings and measurements derived therefrom. Preferably, microparticles of ethylene homopolymers or copolymers, very preferably of polyethylenes with an ultrahigh molecular weight are used, the melting point of which is preferably at least 240° C., more preferably higher than 240° C.

In the layer (s) preferably 0.1-20 wt %, more preferably 5-15 wt %, of the solid microparticles, based in each case on the total weight of the layer (s), are distributed.

As inorganic microparticles of inorganic pigments, fillers, such as of inorganic oxides, inorganic carbonates, salts, glasses, minerals, or metals may be used, the particle sizes of which are at least 50 µm.

Preferably, the layer (s) has a thickness of 10 to 100 µm, more preferably of 5 to 50 µm, very preferably of 10 to 20 µm. Preferably, the layer (s) is not oriented.

Curable polysiloxanes are suitable for preparing the release layer (b) of the inventive release film.

The term "polysiloxane" for the purposes of the present invention refers to compounds which polymer chains are composed alternately of silicon atoms and oxygen atoms. A polysiloxane is based on n recurring siloxane units (—[Si($R_2$)—O]—)$_n$ which, in each case independently of one another, are disubstituted by two organic radicals R. Preferably R, in each case, means $R^1$ or $OR^1$, whereby $R^1$, in each case, means an alkyl radical or an aryl radical. The cured polysiloxane is preferably based on a recurring dialkylsiloxane unit or on a recurring alkylarylsiloxane unit. Depending on the number of Si—O bonds of one single siloxane unit, based in each case on a tetravalent silicon atom, these units may be differentiated into terminal monofunctional siloxanes (M) having one Si—O bond, difunctional siloxanes (D) having two Si—O bonds, trifunctional siloxanes (T) having three Si—O bonds and tetrafunctional siloxanes (Q) having four Si—O bonds. The cured polysiloxane preferably has a crosslinked annular or chainlike structure, more preferably a crosslinked chainlike structure, which is linked via (D), (T) and/or (Q) units to form a two- or three-dimensional network. The number n of recurring siloxane units (—[Si($R_2$)—O]—)$_n$ of a polysiloxane chain is referred to as the degree of polymerization of the polysiloxane.

The release layer (b) is preferably based on at least one cured, i.e., crosslinked, polysiloxane selected from the group comprising addition-crosslinked, preferably metal-catalyzedly addition-crosslinked, condensation-crosslinked, radically crosslinked, cationally crosslinked, and moisture-exposure-crosslinked polysiloxanes.

The release layer (b) is preferably based on at least one cured polysiloxane which has been cured by thermal curing, by curing with electromagnetic radiation, preferably by UV radiation, or by moisture exposure.

Thermally cured polysiloxanes are obtained by thermal hydrosilylation of polysiloxanes having silane functions with a compound having at least one carbon double bond. In the case of the polysiloxanes cured by electromagnetic radiation, the crosslinking of the polysiloxanes is effected by electromagnetic radiation, preferably by UV radiation. The polysiloxanes crosslinked by exposure to moisture, preferably to water, are obtained by a polycondensation reaction in which the at least one silane function and at least one alkoxy group or at least one alkoxysilane group form an Si—O bond under elimination of at least one molecule of alcohol. Accordingly, the polysiloxanes to be cured have in each case the interacting functional groups that are needed for crosslinking.

The release layer (b) preferably comprises at least one flow improving auxiliary agent and/or at least one adhesion improving auxiliary agent.

According to one preferred embodiment the release layer (b) comprises the flow improving auxiliary agent in an amount of 1-10 wt % and/or the adhesion improving auxiliary agent in an amount of 1-5 wt %, based in each case on the total weight of the release layer (b).

A suitable flow improving auxiliary agent for preparing the release layer (b) is at least one polysiloxane which has at least one, preferably terminal, functional group selected from the group comprising functional groups having at least one carbon double bond, preferably vinyl groups, allyl groups, (meth)acrylic acid groups, and (meth)acrylic acid derivative groups. To the person skilled in the art, it is clear that the functional group or groups of the polysiloxane used as flow improving auxiliary agent by crossing are then present in a modified form—that is, in a reacted form—after the polysiloxane has been cured.

A suitable adhesion improving auxiliary agent for the release layer (b) is at least one polysiloxane which has at least one, preferably terminal, functional group selected from the group comprising functional groups having at least one carbon double bond, preferably vinyl groups, allyl groups, (meth)acrylic acid groups, and (meth)acrylic acid derivative groups, more preferably (meth)acrylic ester groups, epoxide groups, isocyanate groups, hydroxyl groups, amine groups, amide groups, carboxyl groups, acid anhydride groups, alkoxy groups, silane groups (Si—H groups), alkoxysilane groups, preferably monoalkoxysilane, dialkoxysilane, and trialkoxysilane groups. More preferably, as adhesion improving auxiliary agent for the release layer (b) is at least one polysiloxane which has at least one, preferably terminal, functional group selected from the group comprising epoxide groups, (meth)acrylic acid groups, and (meth)acrylic acid derivative groups, more preferably (meth)acrylic ester groups. To the person skilled in the art it is clear that the functional group or groups of the polysiloxane used as adhesion improving agents by crosslinking are then present in a modified form—that is, in a reacted form—after the polysiloxane has been cured.

Preferably, the release layer (b) of the inventive release film has a layer thickness of ≤5 µm, more preferably of ≤2 µm, most preferably of 0.3 µm to 1.5 µm.

Preferably, the inventive release film has on at least one of its surfaces a release layer (b), more preferably as an outer layer on a surface of the layer (s) that comprises the solid microparticles.

Preferably, the inventive release film has a layer (a) based on at least one thermoplastic polymer, preferably on at least one thermoplastic olefin homopolymer or copolymer. This layer (a) may be arranged as a support layer of the inventive release film, or is an internal layer of the release film.

The before mentioned olefin homopolymers or copolymers and/or homopolyamides or copolyamides suitable for preparing the layer (s) can also be used for preparing the layer (a).

Very preferably the layer (a) is based on at least one propylene homopolymer or copolymer.

The layer thickness of the layer (a) of the inventive release film is preferably 5 to 30 µm, more preferably 6 to 15 µm.

In a further preferred embodiment layer (a) of the inventive release film is joined to a layer (c) directly, which is preferably based on at least one olefin homopolymer or copolymer.

The before mentioned olefin homopolymers or copolymers and/or homopolyamides or copolyamides suitable for preparing layer (s) can also be used for preparing the layer (c) and/or layer (a).

Very preferably layer (c) is based on at least one propylene homopolymer or copolymer.

In case the layer (c) is an outer layer, the free surface of the layer (c), like the surface of layer (s), may be covered with a release layer (b), in each case as an outer layer or instead of the free surface of the layer (s).

Preferably, the thickness of the layer (c) of the inventive release film is 5 to 30 μm, more preferably 6 to 15 μm.

In a further preferred embodiment of the present invention, a combination comprising layer (s), layer (a), and layer (c) of the inventive release film may be joined via its free surface, preferably via the free surface of the layer (c), to a layer (d), preferably based on at least one olefin homopolymer or copolymer.

The olefin homopolymers or copolymers suitable for preparing the layer (d) are preferably those mentioned already before for preparing the layers (s), (a) and/or (c).

More preferably, layer (d) may be present as an outer layer.

As outer layer, the free surface of the layer (d) and the free surface of the layer (s) may be coated with a release layer (b) or instead of the free surface of the layer (s) only the free surface of layer (d).

The thickness of layer (d) of the inventive release film is preferably 5 to 30 μm, more preferably 6 to 15 μm.

The inventive release film may optionally have a barrier layer (e) preferably arranged between the layer (s) and the layer (a), or the layer (a) and the layer (c), or between the layer (c) and the layer (d), or as one of the two outer layers of the release film.

This barrier layer (e) is preferably a gas barrier layer, more preferably an oxygen barrier layer and/or a water vapor barrier layer, and/or most preferably an oil barrier layer.

Preferably, the barrier layer (e) is based on at least one ethylene-vinyl alcohol copolymer, on at least one polyvinyl alcohol, or on at least one homopolyamide or copolyamide, more preferably on at least one homopolyamide or copolyamide.

Ethylene-vinyl alcohol copolymers (EVOH) suitable for preparing the layer (e) are obtained by substantially complete hydrolysis of corresponding ethylene-containing polyvinyl acetates (EVAc). These fully hydrolyzed ethylene-vinyl acetate copolymers have a degree of hydrolysis of ≥98% and an ethylene fraction of 0.01-80 mol %, preferably of 1-50 mol %.

The layer (e) may also be based on at least one polyvinyl alcohol (PVOH) which has been obtained by substantially complete hydrolysis of polyvinyl acetates (PVA) and which as fully hydrolyzed polyvinyl acetate has a degree of hydrolysis of ≥98%.

The above mentioned homopolyamides and copolyamides suitable for preparing layer (s) can also be used for preparing the barrier layer (e).

Preferably, the barrier layer (e) of the inventive release film has a layer thickness of 3 μm to 25 μm, more preferably of 5 μm to 15 μm.

In one preferred embodiment the inventive release film has at least one barrier layer (e) which is arranged between the layer (s) and the layer (a), or between the layer (a) and the layer (c), and which is joined optionally via an adhesion promoting layer (f) and/or (g) to the layer (s) and/or to the layer (a) and/or to the layer (c).

For the adhesion promoting layers the known adhesive materials can be used. The adhesion promoting layers (f) and (g) preferably consist, in each case independently of one another, of at least one thermoplastic modified polymer, preferably of at least one modified polyolefin homopolymer or copolymer, more preferably of at least one modified propylene homopolymer or copolymer, which is modified with at least one organic acid or with at least one organic acid anhydride, preferably with maleic anhydride.

Preferably, the adhesion promoting layers (f) and (g) of the inventive release film have, in each case independently of one another, a layer thickness of 1 μm to 10 μm, more preferably of 2 μm to 8 μm.

In one very preferred embodiment the inventive release film has a barrier layer (e) based on at least one homopolyamide or copolyamide which is joined, in each case via an adhesion promoting layer (f) or (g), to the layer (s) or to the layer (c), respectively, which are each based on a propylene homopolymer or copolymer, and is coated on at least one of its free surfaces with a release layer (b).

In another preferred embodiment the inventive release film has a layer (s) which is provided with the microparticles and which is joined to the layer (a) or to a laminate of layer (a) and layer (c), which may be joined furthermore to a layer (d), whereby the layers (s), (a), (c), and (d) are each based on at least one propylene homopolymer or copolymer, and whereby at least one free surface of the release film, preferably the free surface of the layer (s), is coated with a release layer (b), and the layer (s) comprises solid microparticles. Preferably, each of the layers of the inventive release film has a melting point which is lower by at least 10° C., preferably by at least 30° C., than the melting point or softening point of the microparticles.

The layer (s), optionally the layers (a), (c) and/or (d), optionally the barrier layer (e) and/or optionally the adhesion promoting layers (f) and/or (g) may if necessary, independently of one another, comprise additives selected from the group comprising antioxidants, antiblocking agents, antifogging agents, antistatic agents, active antimicrobial ingredients, light stabilizers, UV absorbers, UV filters, dyes, color pigments, where the pulverulent additives have average particle sizes which are significantly smaller than those of the microparticles.

The layer (s), optionally the layers (a) and/or (c) and/or (d), optionally the barrier layer (e) and/or optionally the adhesion promoting layers (f) and/or (g) may, independently of one another, contain at least 0.01-30 wt %, preferably at least 0.1-20 wt %, based on the total weight of an individual layer, of at least one of the aforementioned additives.

Preferably, the total layer thickness of the inventive release film is ≤100 μm.

The present invention further provides a method for producing the release film of the invention.

In one preferred embodiment the layer (s), and optionally the other layers of the inventive release film, can be produced and processed as complete multilayer film in the form of a tubular film.

In another preferred embodiment the layer (s) and optionally the other layers of the inventive release film can be produced and processed as a complete cast multilayer film.

Accordingly, the layer (s) and the optionally present layers (a), (c), (d), (e), (f), and (g) of the inventive release film can be produced preferably by coextrusion.

Preferably, the surface structure of the layer (s) is caused by the solid microparticles, distributed in the layer (s), which consist preferably of a thermoplastic polymer. Such surface structure can be achieved by adding the solid microparticles in the form of a masterbatch to the melted matrix polymer, under heating, preferably at a temperature of 190 to 240° C. but always below the melting point of the microparticles, and by distributing the microparticles preferably by means of an extruder. After leaving the extruder, the solid microparticles are distributed within the polymer matrix thereby causing the nonplanar surface structure of the release film.

As a result there is no need for either embossing or any foam structure of the inventive release film.

The irregular surface structure of the release inventive film causes an asymmetric structure at least over one of its surfaces, virtually over its entire width. More particularly, this structure is attributable to protrusions of 10-270 μm as measured from the planar film surface at irregular intervals and in various forms.

The layer (s) or a laminate comprising at least one layer (s), i.e., for example, a laminate comprising a layer (s), layer (a), and optionally a layer (c), may be coated on one or both surfaces, i.e., single-sidedly or double-sidedly, preferably only single-sidedly, with a mixture of at least one uncured polysiloxane and optionally at least one flow improving auxiliary agent and/or at least one adhesion improving auxiliary agent, and by curing this mixture under exposure to heat or to electromagnetic radiation, or by moisture, optionally by addition of at least one UV initiator and/or radical initiator to the mixture, to form the release layer (b), and may be joined to the layer (s) and optionally to one of the layers of the aforementioned laminates. By virtue of the fact that the layer (s) has a nonplanar surface structure, advantageously, the adhesion of the release layer (b) to the uneven, i.e., rough, surface of the layer (s), structured by the microparticles, is firm. As a consequence of this, there is no need for any embossing which is necessary if the produced release films have a planar surface layer, i.e., a smooth layer, after being coated with the release layer. Inventively, it is possible to avoid the disadvantages of the release films with an embossed structure caused by their relatively low stability under thermal and mechanical load, such as on exposure to pressure, and accordingly an inadequate release effect, at least at the damaged sites of the film. Furthermore, one process step, namely the embossing, can be saved. With the inventive release film there is also no need for the formation of a foam structure in order to generate a better release effect.

The respective production processes and corresponding production parameters are general knowledge to a person skilled in the art.

Each of the layers (s), (a), (c), (d), and (e) of the inventive release film can be subjected, as a surface layer, to a surface treatment, such as a corona treatment, plasma treatment and/or flame treatment, for example, preferably prior to the application of at least one release layer (b); with particular preference a corona treatment is carried out.

Preferably, the release film of the invention can be printed and/or provided as colored film.

The inventive release film is preferably used as a releasable protective film and/or liner film.

The present invention accordingly further provides the use of the inventive release film as a releasable protective or liner film, preferably for self-adhesive labels, adhesive tapes, stickers, or self-adhesive liner sheets, such as roofing sheets, preferably for self-adhesive bitumen roofing sheets.

The present invention accordingly further provides self-adhesive labels, adhesive tapes, stickers, or—preferably—roofing sheets, very preferably self-adhesive bitumen roofing sheets, which are covered with an inventive release film.

The inventive release film is preferably used as part of the processing operation in line with the production of self-adhesive roofing sheets which can be rolled up, preferably of self-adhesive bitumen roofing sheets which can be rolled up, as a releasable protective and/or liner film.

Further provided by the present invention, accordingly, is a self-adhesive roofing sheet which can be rolled up in combination with an inventive release film as a releasable protective film or liner film.

Further provided by the present invention is a rolled-up self-adhesive bitumen roofing sheet provided with an inventive release film as a releasable protective film or liner film.

Determination of Separation Force (Release Effect)

The release effect of the inventive release film with respect to an adhesive is given by the separation force in [cN/cm] required for separation, i.e., removal, of the release film from the adhesive.

With this test, a test adhesive tape is adhered, without including any air bubbles, to the entire width of a specimen of the inventive release film or of a comparative film for which the separation force is to be determined. Test adhesive tapes used are TESAFIX A 7475 and TESAFIX K 7476, each having a width of 25 mm. The specimen is cut to dimensions such that a margin of 2 cm of release film, not bearing the test adhesive tape, remains on each longitudinal side of the test adhesive tape in question. The specimen is cut into a number of strips each about 30 cm long. The specimen strips are then placed between thin metal plates and are loaded with weights, the distribution of the specimen strips between the plates necessarily being such that all of the specimen strips are loaded uniformly (loading of the specimen strips: 6.8 kp or 70 g/cm$^2$). Thereafter the specimen strips are stored in a drying cabinet over a period of 20 hours at 70° C. (specimen strips with TESAFIX A 7475) or 40° C. (specimen strips with TESAFIX K 7476). The side of the specimen strip without the test adhesive tape is then introduced, by means of a double-sided adhesive tape, into a metal rail (350×40 mm) of an electronic tear-testing machine, the rail being fixed to a lower tensioning clamp. A rigid film strip with a length of approximately 400 mm is affixed to the test adhesive tape of the specimen strip and is fixed in the tear-testing machine by means of an upper tensioning clamp. The test adhesive tape is then peeled at an angle of approximately 180° with a peel velocity of up to 1800 mm/min, and a force diagram is plotted to determine the separation force. An average value is determined from three measurements in each case.

High-Temperature Bitumen Test (HTB Test)

The HTB test serves to determine the maximum temperature at which the release film can still be detached from an adhesive. The adhesive used was bitumen.

A specimen of the release film of the invention or comparative film, adhered to bitumen, is placed on two steel plates on the base of a drying cabinet, and the specimen is conditioned at a temperature of at least 90° C. until a thermometer whose temperature sensor has been lightly pressed into the bitumen in the rear region of the specimen, between release film and bitumen, indicates a constant temperature and the release film can no longer be separated from the bitumen. The drying cabinet is then switched off. With the door open, the temperature of the specimen then falls slowly. The release film of the specimen is pulled uniformly to assess whether separation from the bitumen is possible. The HTB temperature is the temperature at which the release film of the specimen can be detached from the bitumen of the specimen without leaving any residue.

The inventive example and comparative example below serve to illustrate the invention but are not to be interpreted restrictively.

I. Chemical Characterization of Raw Materials Used:
INSPIRE 137: Propylene copolymer from Dow
DURETHAN C38F: Copolyamide from Lanxess ADMER QB520E: Adhesion promoting polymer from Mitsui AS6104LD: Masterbatch of 25 wt % dispersed polyethylene particles with ultrahigh molecular weight and a particle size of 70μm-300μm and melting point ≥240° C., and 75 wt % polyethylene with melting point around 130° C., from Constab REMAFIN RCL: Titanium(IV) dioxide powder (particle size <20 μm) (60 wt %) in dispersion in polyethylene (40 wt %), from Clariant L066: Silicone oil from Wacker (flow control assistant)

ANCHORSIL 2000 Anchoring assistant from Momentive

Polysiloxane: Polysiloxane with crosslinker and catalyst, from Wacker

II. Production of Release Films

The release films of the comparative example (C) and also of inventive example 1 (IE1) each consist of six layers and have an overall layer thickness of 26 μm in each case. The individual layers of the release films each are adjacent directly in the order in which they are listed thereafter. The individual layers (a), (c), (e), (f), and (g) of the release films of inventive example IE1 and of comparative example C, respectively, were each produced by blown-film coextrusion, and were coated respectively with a release layer (b) in a subsequent operation. The nonplanar, i.e., rough structure of the surface of the inventive release film of example IE1 derives from solid microparticles distributed in the layer (a). The release film of comparative example C, in contrast, has a smooth surface structure.

III. Construction of Release Films

All percent figures below are in wt % in each case.

III.1 Inventive Example (IE1) and Comparative Example (C)

| Layer construction | Raw materials C | Raw materials IE1 |
| --- | --- | --- |
| Release layer (b) Layer thickness (1.0 μm) | Polysiloxane (92.8%), ANCHORSIL 2000 (2.6%), L066 (4.6%) | Polysiloxane (92.8%), ANCHORSIL 2000 (2.6%), L066 (4.6%) |
| Layer (a) or layer (s) (Layer thickness 7.5 μm) | INSPIRE 137 (90%), REMAFIN RCL (10%) | INSPIRE 137 (80%), REMAFIN RCL (10%) AS 6104 LD (10%) |
| Adhesion promoting layer (f) (Layer thickness 2.5 μm) | ADMER QB520E (100%), | ADMER QB520E (100%), |
| Barrier layer (e) (Layer thickness 5.0 μm) | DURETHAN C38F (100%), | DURETHAN C38F (100%), |
| Adhesion promoting layer (g) (Layer thickness 2.5 μm) | ADMER QB520E (100%), | ADMER QB520E (100%), |
| Layer (c) (Layer thickness 7.5 μm) | INSPIRE 137 (90%), REMAFIN RCL (10%) | INSPIRE 137 (90%), REMAFIN RCL (10%) |

IV. Determination of Separation Force and of HTB Temperature

The separation force and the HTB temperature were determined, in each case in accordance with the method described before, for the release films IE1 and for the comparative film C.

| Inventive/ comparative example | Separation force (cN/cm) K 7476 | HTB temperature (° C.) Bitumen Vedatop SU |
| --- | --- | --- |
| C | 4.9 | 99 |
| IE1 | 1.9 | 108 |

The invention claimed is:

1. A release film having a nonplanar but unembossed surface structure which is not caused by a foam structure, comprising at least one layer (s) based on at least one thermoplastic matrix polymer selected from the group consisting of olefin homopolymers or copolymers and polyamides or copolyamides and comprising distributed solid microparticles having a particle size of at least 50 μm and having a melting point at least 10° C. higher than that of the matrix polymer, and at least one of the surfaces of the release film is covered by a release layer (b) as outer layer, based on at least one cured polysiloxane.

2. A release film as claimed in claim 1, wherein the microparticles have a particle size distribution from 50 μm to 500 μm.

3. A release film as claimed in claim 1, wherein the microparticles are based on a thermoplastic polymer or on an inorganic compound or an inorganic material.

4. A release film as claimed in claim 1, wherein the melting point of the microparticles is at least 30° C. higher than that of the matrix polymer.

5. A release film as claimed in claim 1, wherein one surface of said at least one layer (s) is covered by a release layer (b).

6. A release film as claimed in claim 1, wherein the nonplanar surface structure has elevations which have a height of up to 300 μm.

7. A release film as claimed in claim 1, wherein the layer (s) comprises 5-15 wt % based on the total weight of the layer (s), of solid microparticles.

8. A release film as claimed claim 1, wherein the release layer (b) comprises at least one flow improving auxiliary agent and/or at least one adhesion improving auxiliary agent.

9. A release film as claimed in claim 8, wherein the release layer (b) contains the flow improving auxiliary agent in an amount of 1-10wt % and/or the adhesion improving auxiliary agent in an amount of 1-5 wt %, based in each case on the total weight of the release layer (b).

10. A release film as claimed in claim 1, wherein the layer (s) is joined by its free surface to a layer (a) based on at least one olefin homopolymer or copolymer or on a laminate of a layer (a) and a layer (c), which comprises or comprise no solid microparticles.

11. A release film as claimed in claim 1, wherein the release film has at least one barrier layer (e) adjacent to the layer (a) which layer (e) is bonded to the layer (a) respectively the layer (c) optionally via an adhesion promoting layer (f) respectively (g).

12. A release film as claimed in claim 1, wherein the barrier layer (e) is based on at least one homopolyamide or copolyamide which is bonded in each case via an adhesion promoting layer (f) or (g) to layer (a) or to layer (c), respectively, which layer (a) respectively (c), is based on a propylene homopolymer or copolymer.

13. A releasable protective or cover film for self-adhesive labels, adhesive tapes, stickers, or self-adhesive roofing comprising the release film of claim 1.

14. A self-adhesive roofing sheet provided with a release film as releasable protective or cover film as claimed in claims 1 which can be winded up.

15. A winded-up, self-adhesive bitumen roofing sheet provided with a release film of claim 1 as releasable protective or cover film.

* * * * *